US010682710B2

(12) United States Patent
Stojanovski

(10) Patent No.: US 10,682,710 B2
(45) Date of Patent: Jun. 16, 2020

(54) CUTTING TOOL ASSEMBLY

(71) Applicant: Stojan Stojanovski, Shelby Township, MI (US)

(72) Inventor: Stojan Stojanovski, Shelby Township, MI (US)

(73) Assignee: Stojan Stojanovski, Shelby Township ( * ) Notice: Subject to any disclaimer, the term of this patent is extended or adjusted under 35 U.S.C. 154(b) by 0 days.

(21) Appl. No.: 15/485,945

(22) Filed: Apr. 12, 2017

(65) Prior Publication Data

US 2018/0297125 A1    Oct. 18, 2018

(51) Int. Cl.
*B23B 31/107* (2006.01)
*B23B 31/00* (2006.01)

(52) U.S. Cl.
CPC ........ *B23B 31/1076* (2013.01); *B23B 31/005* (2013.01); *B23B 2231/0224* (2013.01); *Y10T 279/17821* (2015.01)

(58) Field of Classification Search
CPC ............ B23B 31/1075; B23B 31/1076; B23B 2231/0224; B23B 2231/46; B23B 2265/12; B23B 31/005; B23C 5/26; Y10T 408/907; Y10T 409/309408; Y10T 409/30952; Y10T 279/17821
See application file for complete search history.

(56) References Cited

U.S. PATENT DOCUMENTS

| 3,022,084 | A | * | 2/1962 | Dresback ............ B23B 31/1076 279/83 |
| 3,586,344 | A | * | 6/1971 | Nixon ..................... B23B 31/02 279/3 |
| 4,877,360 | A | * | 10/1989 | Pfalzgraf .............. B23B 31/008 409/234 |
| D347,848 | S | * | 6/1994 | Maynard, Jr. ................. D15/139 |
| 5,399,051 | A | * | 3/1995 | Aken ...................... B23B 51/02 279/83 |
| D360,641 | S | * | 7/1995 | Asano .......................... D15/138 |
| 5,468,102 | A | | 11/1995 | Stojanovski |
| 5,957,634 | A | * | 9/1999 | Carpinetti ........... B23B 31/1071 279/143 |
| D430,584 | S | * | 9/2000 | Kouvelis ....................... D15/139 |
| 6,299,394 | B1 | * | 10/2001 | Stojanovski ........ B23B 31/1076 279/83 |
| 6,644,152 | B1 | * | 11/2003 | Stojanovski .......... B23B 31/008 407/34 |
| D487,900 | S | * | 3/2004 | Mikiya ........................ D15/139 |
| 7,112,021 | B2 | * | 9/2006 | Pantzar ................... B23B 31/11 279/8 |
| 8,360,699 | B2 | | 1/2013 | Stojanovski |
| 2002/0158425 | A1 | * | 10/2002 | Chen ...................... A01B 1/227 279/76 |

(Continued)

FOREIGN PATENT DOCUMENTS

| DE | 19626485 A1 * | 2/1997 | ........... B23B 31/005 |
| WO | WO 9308946 A1 * | 5/1993 | ........... B23B 31/005 |

*Primary Examiner* — Eric A. Gates
*Assistant Examiner* — Chwen-Wei Su
(74) *Attorney, Agent, or Firm* — Quinn IP Law

(57) ABSTRACT

A cutting tool assembly includes a tool body and a tool holder. The tool holder includes a cylindrical portion connected to the tool body, an eccentric drive member, and a fastener hole configured to receive a securing fastener. The eccentric drive member can include a trigon portion comprising a rounded triangular cross section.

6 Claims, 6 Drawing Sheets

(56) References Cited

U.S. PATENT DOCUMENTS

| | | | |
|---|---|---|---|
| 2003/0075879 A1* | 4/2003 | Lundblad | B23B 31/008 279/102 |
| 2004/0213642 A1* | 10/2004 | Pantzar | B23B 31/008 409/234 |
| 2011/0097163 A1* | 4/2011 | Swiatowy | B23C 3/007 407/40 |
| 2015/0360300 A1* | 12/2015 | Hecht | B23B 51/00 408/231 |

* cited by examiner

CUTTING TOOL ASSEMBLY

TECHNICAL FIELD

This disclosure is related to an apparatus useful to align and secure a cutting tool assembly to a mating tool driver assembly. In particular, the disclosure is related to a configuration useful to secure the cutting tool assembly and easily release the tool at the completion of a cutting task.

BACKGROUND

The statements in this section merely provide background information related to the present disclosure. Accordingly, such statements are not intended to constitute an admission of prior art.

A cutting tool assembly is configured to receive an input torque from a mating tool driver assembly. The cutting tool assembly includes at least one cutting edge upon a tool tip that utilizes the input torque to cut a workpiece.

U.S. Pat. No. 5,468,102 titled "Milling Tool Holder" for which the present applicant was the sole inventor discloses one previously known method and apparatus for securing a cutting tool assembly to a mating tool driver and is included herein by reference. According to this reference, a tool holder portion of a cutting tool assembly is provided with a cylindrical section. A pair of conically shaped screw cavities can be formed in opposite sides of the cylindrical section, such that when the cylindrical portion is inserted within a mating cylindrical cavity in a mating tool driver, a pair of threaded fasteners can be used to lock the tool holder portion into place. This design has a number of advantages, however, it also includes a drawback that the screws together bear a large or majority portion of the input torque applied to the tool through the mating tool driver. This input torque applied to the fasteners can damage the fasteners, which can have a number of adverse affects including making disassembly of the tool difficult or impossible. Some tools must be destroyed when the fasteners deform too much after rough use.

U.S. Pat. No. 8,360,699 titled "Cutting Tool Assembly with an Eccentric Drive Member" for which the present applicant was the sole inventor discloses one previously known method and apparatus for securing a cutting tool assembly to a mating tool driver and is included herein by reference. According to this reference, a tool holder portion of a cutting tool assembly is provided with a first conical portion attached to a second eccentric or oval shaped drive member portion, with a third cylindrical portion including a locking mechanism. The eccentric drive member provides a benefit, enabling the tool to be rotated within the mating tool driver, with surfaces of the eccentric drive member aligning to a mating oval shaped cavity. In this way, the eccentric drive member can transmit torque from the mating tool driver to the cutting tool assembly without deforming a plurality of set screws. This design has a number of advantages, however, it also includes a drawback that the conical section and a mating conical cavity in the mating tool driver must be constructed to tight tolerances in order to ensure proper tool alignment. Such tight tolerances slow manufacturing time of the cutting tool assembly and introduce a source of tool malfunction, in that any small deformity or damage to the conical section can invalidate the tool or require intensive repair of the conical section to realign the tool. Further, because the conical section, by increasing in size toward the flat collar section joining the tool holder portion to the rest of the cutting tool assembly body, the size of that flat collar is reduced. This increases an ability of the tool to cant or tilt slightly within the cavity of the mating tool driver. Combined with tool strain created while cutting through a work piece, this tilt can lock the cutting tool assembly within the mating tool driver. As a result, in order to remove the cutting tool assembly from the mating tool driver, one must frequently use a hammer to knock the cutting tool assembly loose from the mating tool driver, frequently causing damage or increased wear to the cutting tool assembly.

SUMMARY

A cutting tool assembly includes a tool body and a tool holder. The tool holder includes a cylindrical portion connected to the tool body, an eccentric drive member, and a fastener hole configured to receive a securing fastener. The eccentric drive member can include a trigon portion comprising a rounded triangular cross section.

BRIEF DESCRIPTION OF THE DRAWINGS

One or more embodiments will now be described, by way of example, with reference to the accompanying drawings, in which:

FIG. 7A illustrates the tool holder and mating cavity in an initial unstressed condition;

FIG. 7B illustrates the tool holder and mating cavity of FIG. 7A in a stressed state, with a torque and a lateral force applied thereto.

FIG. 8A illustrates the exemplary tool holder of the cutting tool assembly in an initial unstressed state;

FIG. 8B illustrates the cutting tool assembly of FIG. 8A in a stressed state, with a torque and a lateral force applied thereto

DETAILED DESCRIPTION

A tool holder portion of a cutting tool assembly includes a cylindrical alignment portion and an eccentric drive member portion. The cylindrical alignment portion can include a fastener cavity configured to accept a threaded fastener in order to secure the tool holder within a mating cavity. The eccentric drive member portion is configured to be aligned with a mating eccentric cavity within a mating tool driver, such that a portion of input torque transmitted from the mating tool driver to the cutting tool assembly is transmitted through the eccentric drive member, with the fastener transmitting one of a portion of the input torque or none of the input torque.

Figure 1:
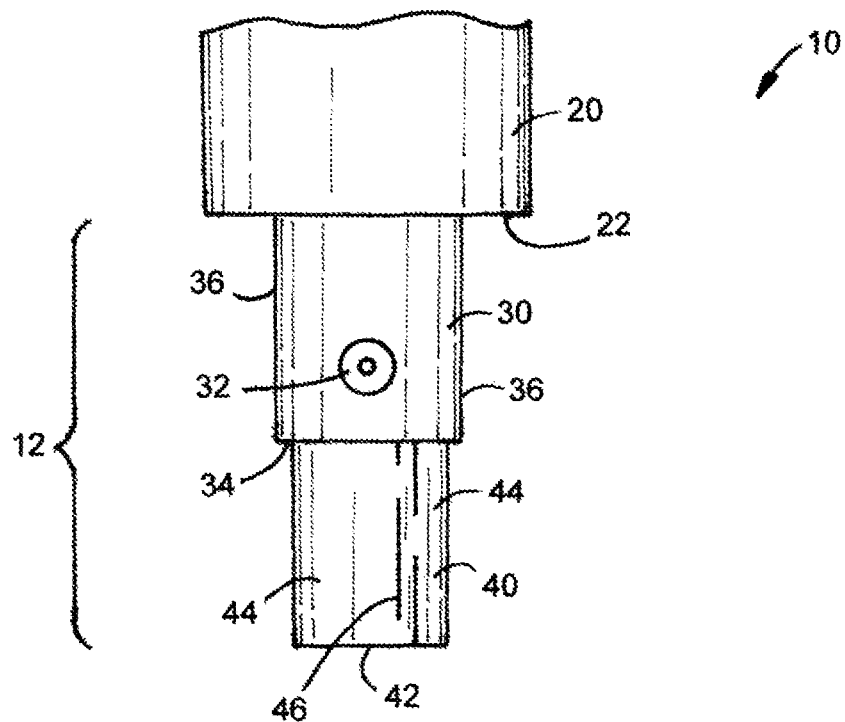
FIG. 1 illustrates an exemplary cutting tool assembly including a tool holder and a cutting tool body, including a cylindrical portion, a trigon portion, and a fastener hole, in accordance with the present disclosure.

Referring now to the drawings, wherein the showings are for the purpose of illustrating certain exemplary embodiments only and not for the purpose of limiting the same, FIG. 1 illustrates an exemplary cutting tool assembly 10 including tool holder 12 and cutting tool body 20. Tool holder 12 includes cylindrical portion 30 and trigon portion 40. Tool holder 12 is configured to be inserted within a tool driver assembly, which provides input torque to the cutting tool assembly 10. Tool holder 12 is configured to removably affix the cutting tool assembly 10 to the tool driver assembly, providing a precisely controllable cutting tool edge or edges while enabling easy removal of the cutting tool assembly 10 from the tool driver assembly after a cutting task is complete.

Cylindrical portion 30 includes substantially parallel side walls 36. Fastener hole 32 permits a fastener to be used to lock the tool holder 12 into place within the tool driver assembly. Cutting tool body 20 includes a wider radius than cylindrical portion 30. Cylindrical portion 30 is attached to flat bottom face 22 of cutting tool body 20. Cylindrical portion 30 serves as a first contact point with the mating tool driver assembly, locating the cutting tool assembly through precise fitting of the cylinder shape to a mating cylinder cavity and fixing that spatial relationship with a fastener affixed though the tool driver assembly to fastener hole 32. The cylinder shape further prevents the cutting tool assembly 10 from canting or tilting within the tool driver assembly cavity, thereby preventing a tool lock condition.

Trigon portion 40 includes a eccentric drive member including a substantially curved triangular cross-section defined by three flatter arcuate faces 44 separated by three rounded vertices 46. Trigon portion 40 is attached to bottom flat face 34 of cylindrical potion 30 and includes a flat bottom face 42. Trigon portion 40 is configured be inserted into a similar shaped trigon cavity within the mating tool driver assembly, wherein the cavity within the mating tool driver assembly is slightly larger than trigon portion 40. Trigon portion 40, once within the mating cavity, is slightly rotated in an opposite direction which torque is applied through the tool, such that three of the faces 44 are abutted and in contact with mating faces of the mating cavity. The faces 44 of the trigon portion 40, in contact with the mating cavity, serve as a second contact point with the mating tool driver assembly. The triangular cross section of trigon portion 40, portion in other embodiments, can be substituted with a eccentric drive member with a similar oval or rounded square.

Figure 2:
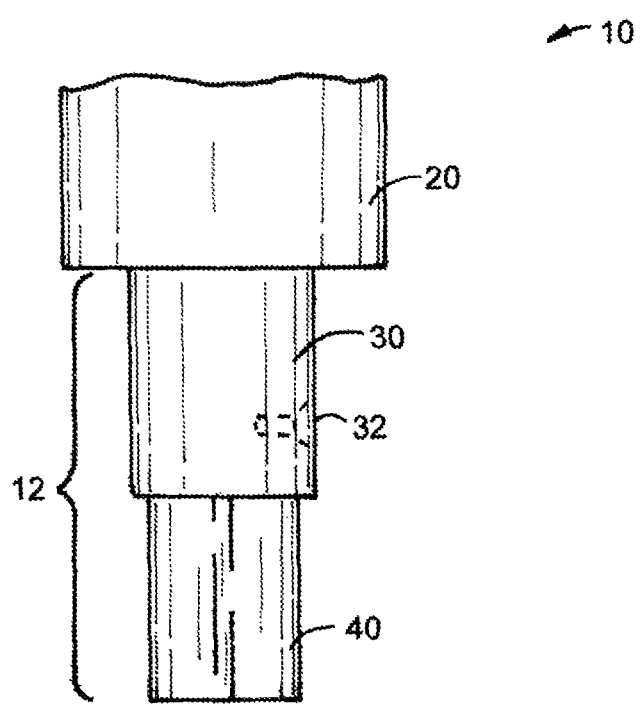
FIG. 2 illustrates the cutting tool assembly of FIG. 1 in side view, in accordance with the present disclosure.

FIG. 2 illustrates the cutting tool assembly 10 of FIG. 1 in side view. Cutting tool assembly 10 includes cutting tool body 20 and tool holder 12 including cylindrical portion 30 and trigon portion 40. Fastener hole 32 is illustrated in profile.

Figure 3:
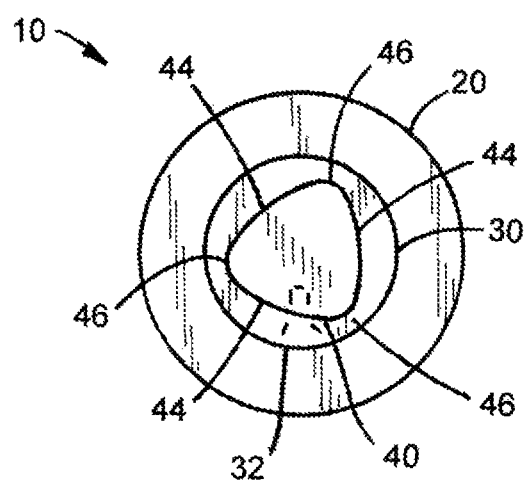
FIG. 3 illustrates the cutting tool assembly of FIG. 1, viewed from the bottom, in accordance with the present disclosure.

FIG. 3 illustrates the cutting tool assembly 10 of FIG. 1, viewed from the bottom. Cutting tool assembly 10 includes cutting tool body 20. Further, cylindrical portion 30 is illustrated including fastener hole 32. Further, trigon portion 40 is illustrated including a substantially curved triangular cross-section defined by three flatter arcuate faces 44 separated by three rounded vertices 46.

Figure 4:
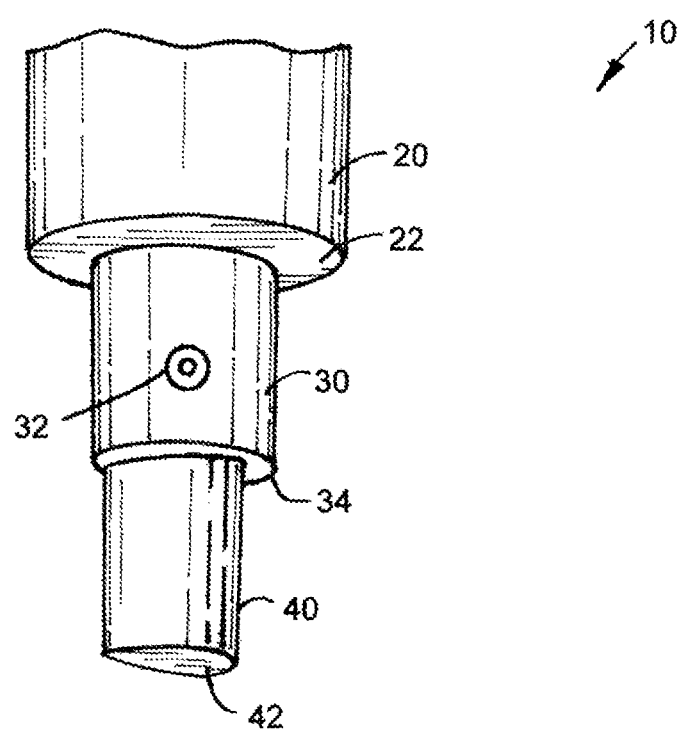
FIG. 4 illustrates the cutting tool assembly of FIG. 1 in perspective view, in accordance with the present disclosure.

FIG. 4 illustrates the cutting tool assembly 10 of FIG. 1 in perspective view. Cutting tool assembly 10 includes cutting tool body 20 including flat bottom face 22, cylindrical portion 30 including flat bottom face 32, and trigon portion 40 including flat bottom face 42. Fastener hole 32 is illustrated.

Figure 5:
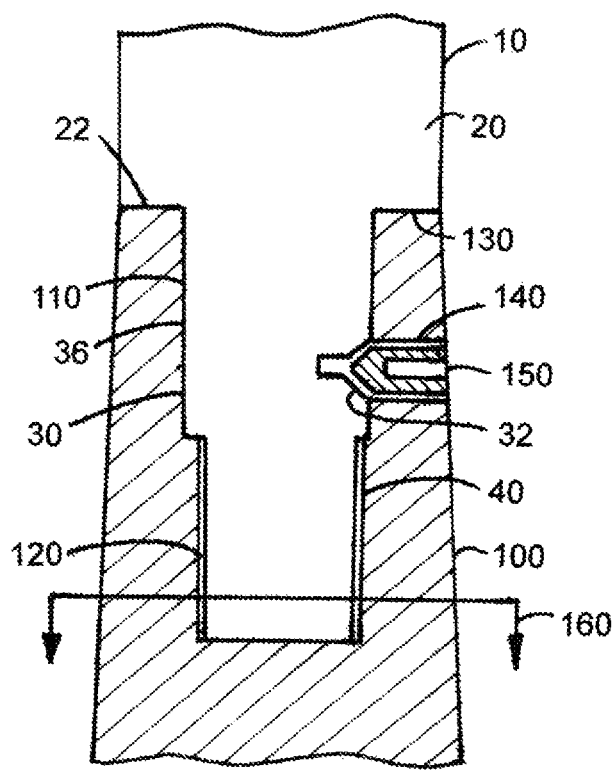
FIG. 5 illustrates the cutting tool assembly of FIG. 1 inserted within an exemplary mating tool driver assembly in cross-section, in accordance with the present disclosure.

FIG. 5 illustrates the cutting tool assembly 10 of FIG. 1 inserted within an exemplary mating tool driver assembly 100 in cross-section. Cutting tool assembly 10 includes cutting tool body 20 including flat bottom face 22, cylindrical portion 30, and trigon portion 40. Tool driver assembly 100 includes flat face 130 mating to bottom flat face 22, cylindrical shaped cavity 110 mating to walls 36 of cylindrical portion 30, and trigon shaped cavity 120 mating to trigon portion 40. Fastener 150 is illustrated inserted within cavity 140 of tool driver assembly 150 affixed within fastener hole 32. Section 160 is provided for illustration in related FIG. 6.

FIG. 5 illustrates cylindrical portion 30 and bottom flat face 22. Parallel side walls 36 of cylindrical portion 30 are substantially perpendicular to bottom flat face 22. Whereas the configuration of U.S. Pat. No. 8,360,699 includes a conical section, where side walls of that section engage with mating cavity walls based upon how far the tool holder is inserted into the cavity. Alignment of the side walls to that previous design are dependent upon full engagement of the tool holder, and if in the straining and related deformation of the tool as torque is transmitted through the tool the walls are no longer fully engaged, alignment of the tool can be compromised. The present configuration is superior to that previous configuration because cylindrical portion 30, with walls parallel to a longitudinal axis of the tool holder, aligns with the mating cylindrical shaped cavity 110 regardless of strain and deformation of cylindrical portion 30. Unlike a conical section, alignment of cylindrical portion 30 to the mating cavity is not dependent upon the portion being firmly seated with the mating cavity in an axial direction.

Figure 7A:
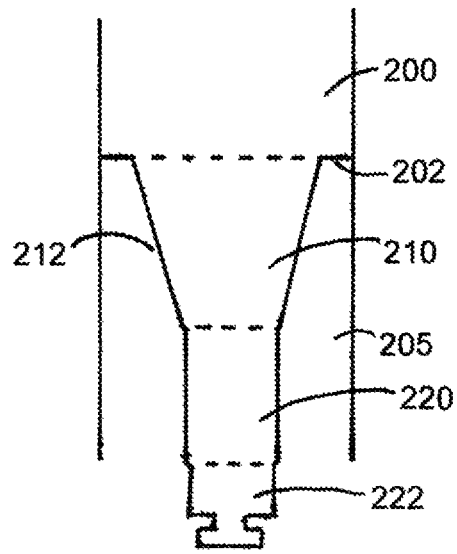
FIGS. 7A and 7B illustrate an exemplary tool holder configuration of a known prior art tool holder, including a conical section used to align the tool holder to a mating cavity, in accordance with the present disclosure.
Figure 7B:
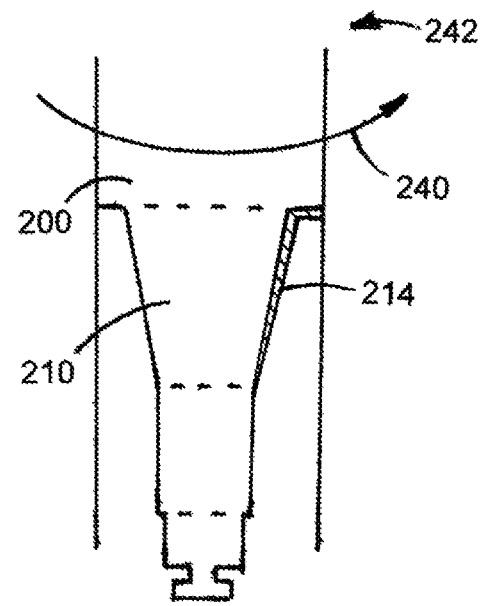

FIGS. 7A and 7B illustrate an exemplary tool holder configuration of a known prior art tool holder, including a conical section used to align the tool holder to a mating cavity. FIG. 7A illustrates the tool holder and mating cavity in an initial unstressed condition. Cutting tool assembly 200 is illustrated including conical portion 210, eccentric driver portion 220, and retention portion 222. Conical portion 210 includes side walls 212 which are angled in relation to a longitudinal axis of the tool. Bottom flat face 202 connects conical portion 210 with a body of the tool assembly. Retention portion 222 locks into mating features in mating tool driver 205. In the relaxed state of FIG. 7A, side walls 212 align with walls of the mating cavity in mating tool driver 205.

FIG. 7B illustrates the tool holder and mating cavity of FIG. 7A in a stressed state, with a torque 240 and a lateral force 242 applied thereto. As stress is applied to cutting tool assembly 200, the tool assembly deforms. In the exemplary illustration of FIG. 7B, gap 214 is illustrated between conical portion 210 and the neighboring cavity wall. This visible gap is provided for purposes of illustration, whereas deformation in actual parts under stress can be significant although less visible to an ordinary observer. With the creation of gap 214, the original alignment of the tool holder of cutting tool assembly 200 and the mating tool driver can be disturbed, with the deformed pieces returning to a different alignment than the original alignment. This can create a tool lock condition, where some of the deformation in the pieces remains and locks the pieces together, requiring a mitigating act such as a hammer strike to separate the tool pieces.

Figure 8A:
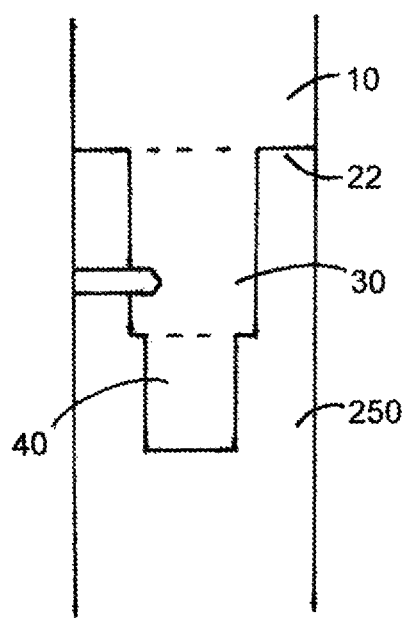
FIGS. 8A and 8B illustrate an exemplary tool holder configuration according to the present application, in accordance with the present disclosure.
Figure 8B:
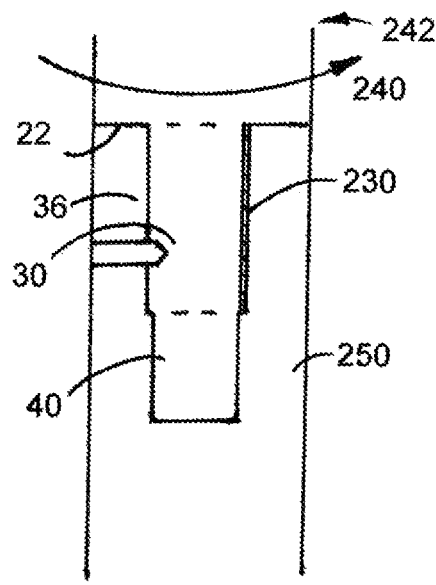

FIGS. 8A and 8B illustrate an exemplary tool holder configuration according to the present application. FIG. 8A illustrates the exemplary tool holder of the cutting tool assembly in an initial unstressed state. Cutting tool assembly 10 is illustrated including cylindrical portion 30 and trigon portion 40, with bottom flat surface 22 joining cylindrical portion 30 to a main body of cutting tool assembly 10. Cutting tool 10 is illustrated within a mating tool driver 250.

FIG. 8B illustrates cutting tool assembly 10 of FIG. 8A in a stressed state, with a torque 240 and a lateral force 242 applied thereto. As stress is applied to cutting tool assembly 10, the tool assembly deforms. However, alignment of the tool holder within the cavity of mating tool driver 250 is dependent upon parallel side walls 36 of cylindrical portion 30 aligning with the parallel side walls of the mating cylindrical shape cavity of mating tool driver 250. Gap 230 caused by deformation of cutting tool assembly 10 typically creates space between parallel walls 36 and the mating cavity walls. Upon removing stress from the pieces, the cylindrical walls tend to relax to their original alignment or include less residual stress than the pieces of FIG. 7B. Further, bottom flat face 22, including a larger surface area than a comparable bottom flat face 202 of FIG. 7A due to the widening radius of the conical portion, tends to keep the cutting tool assembly 10 in alignment with the mating surface of mating tool driver 250. As a result, cutting tool assembly 10 of FIG. 8B exhibits easier decoupling and less opportunity to damage the tools than the cutting tool assembly of FIG. 7B.

Figure 6:
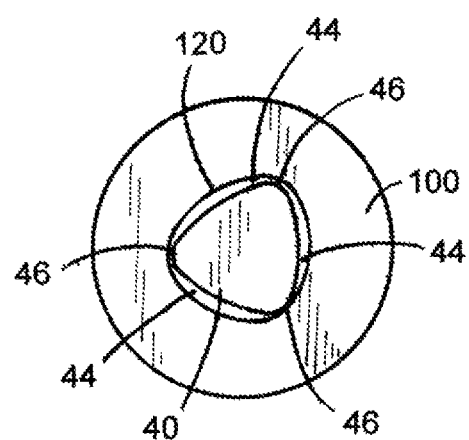
FIG. 6 illustrates the trigon portion of FIG. 5 within a trigon shaped cavity of mating tool driver, in cross section, in accordance with the present disclosure.

FIG. 6 illustrates the trigon portion 40 of FIG. 5 within trigon shaped cavity 120 of tool driver assembly 100, in cross section as defined by section 160 of FIG. 5. Trigon portion 40 includes a substantially curved triangular cross-section defined by three flatter arcuate faces 44 separated by three rounded vertices 46. As the trigon portion 40 is rotated within cavity 120, faces 44 come into contact with mating walls of cavity 120.

The cutting tool assembly of the present disclosure can include any number of known cutting instruments or tooling, included but not limited to an endmill, a ballmill, a drill, an indexable cutter, a modular cutter, and a chuck for attaching various bits.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus comprising a cutting tool assembly, comprising:
   a tool body; and
   a tool holder comprising a longitudinal axis around which the tool holder is configured to spin, the tool holder comprising:
      a cylindrical portion connected to the tool body comprising a cone-shaped fastener hole perpendicular with the longitudinal axis; and
      a trigon portion comprising a rounded triangular cross section connected to the cylindrical portion, the rounded triangular cross section comprising:
         three rounded vertices; and
         three arcuate faces between each of the rounded vertices;
   wherein the cone-shaped fastener hole is configured to receive a securing fastener and thereby rotationally orient and seat the trigon portion against a mating cavity and prevent the tool holder from becoming locked into the mating caving as a result of tool use.

2. The apparatus of claim 1, wherein the tool body includes a wider radius than the cylindrical portion;
   wherein the tool body comprises a bottom flat face; and
   wherein the cylindrical portion connects to the tool body at a center of the bottom flat face.

3. An apparatus comprising a cutting tool assembly, comprising:
   a tool body and
   a tool holder comprising a longitudinal axis around which the tool holder is configured to spin, the tool holder comprising:
      a cylindrical portion connected to the tool body comprising a cone-shaped fastener hole perpendicular with the longitudinal axis; and
      a trigon portion comprising a rounded triangular cross section connected to the cylindrical portion, the rounded triangular cross section comprising:
         three rounded vertices; and
         three arcuate faces between each of the rounded vertices;
   wherein the cone-shaped fastener hole is configured to receive a securing fastener and thereby rotationally orient and seat the trigon portion against a mating cavity and prevent the tool holder from becoming locked into the mating cavity as a result of tool use;
   wherein the tool body includes a wider radius than the cylindrical portion;
   wherein the tool body comprises a bottom flat face; and
   wherein the cylindrical portion connects to the tool body at a center of the bottom flat face.

4. A system comprising a cutting tool assembly and a mating tool driver, comprising:
   the cutting tool assembly, comprising;
      a tool body; and
      a tool holder comprising a longitudinal axis around which the tool holder is configured to spin, the tool holder comprising:
         a cylindrical portion connected to the tool body comprising a cone-shaped fastener hole perpendicular with the longitudinal axis; and
         a trigon portion comprising a rounded triangular cross section connected to the cylindrical portion, the rounded triangular cross section comprising:
            three rounded vertices; and
            three arcuate faces between each of the rounded vertices;
   the mating tool driver, comprising:
      a cavity configured to receive the tool holder; and
      a cavity configured to receive the securing fastener; and
   the securing fastener affixed to the mating tool driver and the fastener hole;
   wherein the cone-shaped fastener hole is configured to receive a securing fastener and thereby rotationally orient and seat the trigon portion against a mating cavity and prevent the tool holder from becoming locked into the mating cavity as a result of tool use.

5. The system of claim 4, wherein the cavity configured to receive the tool holder includes a cavity shaped to receive the trigon portion.

6. The system of claim 4, wherein the tool body includes a wider radius than the cylindrical portion;
   wherein the tool body comprises a bottom flat face;
   wherein the cylindrical portion connects to the tool body at a center of the bottom flat face; and
   wherein the mating tool driver further comprises a flat face configured to abut the bottom flat face.

\* \* \* \* \*